US008520557B2

(12) United States Patent
Rajan

(10) Patent No.: US 8,520,557 B2
(45) Date of Patent: Aug. 27, 2013

(54) METHODS AND APPARATUS FOR PEER-TO-PEER NON-SIMULTANEOUS COMMUNICATION

(75) Inventor: Rajeev D Rajan, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 746 days.

(21) Appl. No.: 12/409,725

(22) Filed: Mar. 24, 2009

(65) Prior Publication Data

US 2010/0246452 A1   Sep. 30, 2010

(51) Int. Cl.
*H04B 7/005* (2006.01)
(52) U.S. Cl.
USPC .......................................... 370/277; 370/437
(58) Field of Classification Search
USPC ................. 370/277, 296, 310; 709/206–207; 455/456, 403
See application file for complete search history.

(56) References Cited

U.S. PATENT DOCUMENTS

| 2002/0143959 A1 | 10/2002 | El-Baze et al. |
| 2004/0181584 A1 | 9/2004 | Rosen et al. |
| 2004/0242242 A1 * | 12/2004 | Wu et al. ..................... 455/456.5 |
| 2005/0141541 A1 | 6/2005 | Cuny et al. |
| 2009/0204885 A1 * | 8/2009 | Ellsworth et al. ............. 715/234 |

OTHER PUBLICATIONS

International Search Report and Written Opinion ,PCT/US2010/028547, International Search Authority—European Patent Office—Sep. 22, 2010.

* cited by examiner

*Primary Examiner* — David Oveissi
(74) *Attorney, Agent, or Firm* — Abdollah Katbab

(57) ABSTRACT

A method and apparatus for facilitating communication between a plurality of wireless devices is provided. The method may comprise establishing, by a first wireless device, a communication path with at least one of a plurality of wireless devices via a network, wherein the communication path provides for half duplexed direct communication between the first wireless device and the at least one of the plurality of wireless devices, maintaining each established communication path until a triggering event occurs, generating content, in the first wireless device, to be transmitted to at least one of the plurality of wireless devices with the established communication path, wherein the generated content includes non-voice data, and transmitting, from the first wireless device, the generated content through the established communication path to the at least one wireless device of the plurality of wireless devices.

36 Claims, 6 Drawing Sheets

METHODS AND APPARATUS FOR PEER-TO-PEER NON-SIMULTANEOUS COMMUNICATION

BACKGROUND

1. Field

The disclosed aspects relate to communications between a plurality of wireless devices over a network.

2. Background

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Further, many such cellular telephones are being manufactured with relatively large increases in computing capabilities, and as such, are becoming tantamount to small personal computers and hand-held PDAs. However, these smaller and more powerful personal computing devices are typically severely resource constrained. For example, the screen size, amount of available memory and file system space, amount of input and output capabilities and processing capability may each be limited by the small size of the device. Because of such severe resource constraints, it is often typically desirable, for example, to maintain a limited size and quantity of software applications and other information residing on such remote personal computing devices, e.g., client devices.

Currently, in order to route data files between wireless devices connected to a communication network, e.g., a code division multiple access (CDMA) network, a general packet radio service (GPRS) network, a universal mobile telecommunications system (UMTS) network, or other network, a multimedia server (MMS), also connected with communication network, is required in order to distribute the data files from one wireless device to another wireless device. Thus, improved apparatus and methods for facilitating communications between a plurality of wireless devices over a network are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with facilitating communication between a plurality of wireless devices. According to one aspect, a method for facilitating communication between a plurality of wireless devices is provided. The method can comprise establishing, by a first wireless device, a communication path with at least one of a plurality of wireless devices via a network, wherein the communication path provides for half duplexed direct communication between the first wireless device and the at least one of the plurality of wireless devices, maintaining each established communication path until a triggering event occurs, generating content, in the first wireless device, to be transmitted to at least one of the plurality of wireless devices with the established communication path, wherein the generated content includes non-voice data, and transmitting, from the first wireless device, the generated content through the established communication path to the at least one wireless device of the plurality of wireless devices.

Another aspect relates to an apparatus. The apparatus can include a connection module enabled to establish a communication path with at least one of a plurality of wireless devices via a network, wherein the communication path provides for half duplexed direct communication between the first wireless device and the at least one of the plurality of wireless devices, and to maintain each established communication path until a triggering event occurs, a content module enabled to generate content to be transmitted to at least one of the plurality of wireless devices with an established communication path, wherein the generated content includes non-voice data, and the connection module further enabled to transmit the generated content through the at least one established communication path to the to corresponding wireless device of the plurality of wireless devices.

Yet another aspect relates to at least one processor configured to facilitate mobile virtual network operator access for a client. The at least one processor can a first module for establishing, by a first wireless device, a communication path with at least one of a plurality of wireless devices via a network, wherein the communication path provides for half duplexed direct communication between the first wireless device and the at least one of the plurality of wireless devices, a second module for maintaining each established communication path until a triggering event occurs, a third module for generating content, in the first wireless device, to be transmitted to at least one of the plurality of wireless devices with an established communication path, wherein the generated content includes non-voice data, and a fourth module for transmitting, from the first wireless device, the generated content through the established communication path to the at least one wireless device of the plurality of wireless devices.

Still another aspect relates to a computer program product comprising a computer-readable medium. The computer-readable medium can include a first set of codes for causing a computer to establish a communication path with at least one of a plurality of wireless devices via a network, wherein the communication path provides for half duplexed direct communication between the first wireless device and the at least one of the plurality of wireless devices, a second set of codes for causing a computer to maintain each established communication path until a triggering event occurs, a third set of codes for causing a computer to generate content to be transmitted to at least one of the plurality of wireless devices with an established communication path, wherein the generated content includes non-voice data, and a fourth set of codes for causing a computer to transmit the generated content through the established communication path to the at least one wireless device of the plurality of wireless devices.

Yet another aspect relates to an apparatus. The apparatus can include means for establishing, by a first wireless device, a communication path with at least one of a plurality of wireless devices via a network, wherein the communication path provides for half duplexed direct communication between the first wireless device and the at least one of the plurality of wireless devices, means for maintaining each established communication path until a triggering event occurs, means for generating content, in the first wireless device, to be transmitted to at least one of the plurality of wireless devices with an established communication path, wherein the generated content includes non-voice data, and means for transmitting, from the first wireless device, the generated content through the established communication path to the at least one wireless device of the plurality of wireless devices.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The communication of content between wireless devices may be accomplished through using a communication path established and maintained over a network. In particular, the present aspects enable wireless devices to set up and maintain peer-to-peer communication paths to exchange content, e.g., voice, text, video, and other multimedia content, without requiring a dedicated network server.

Figure 1:
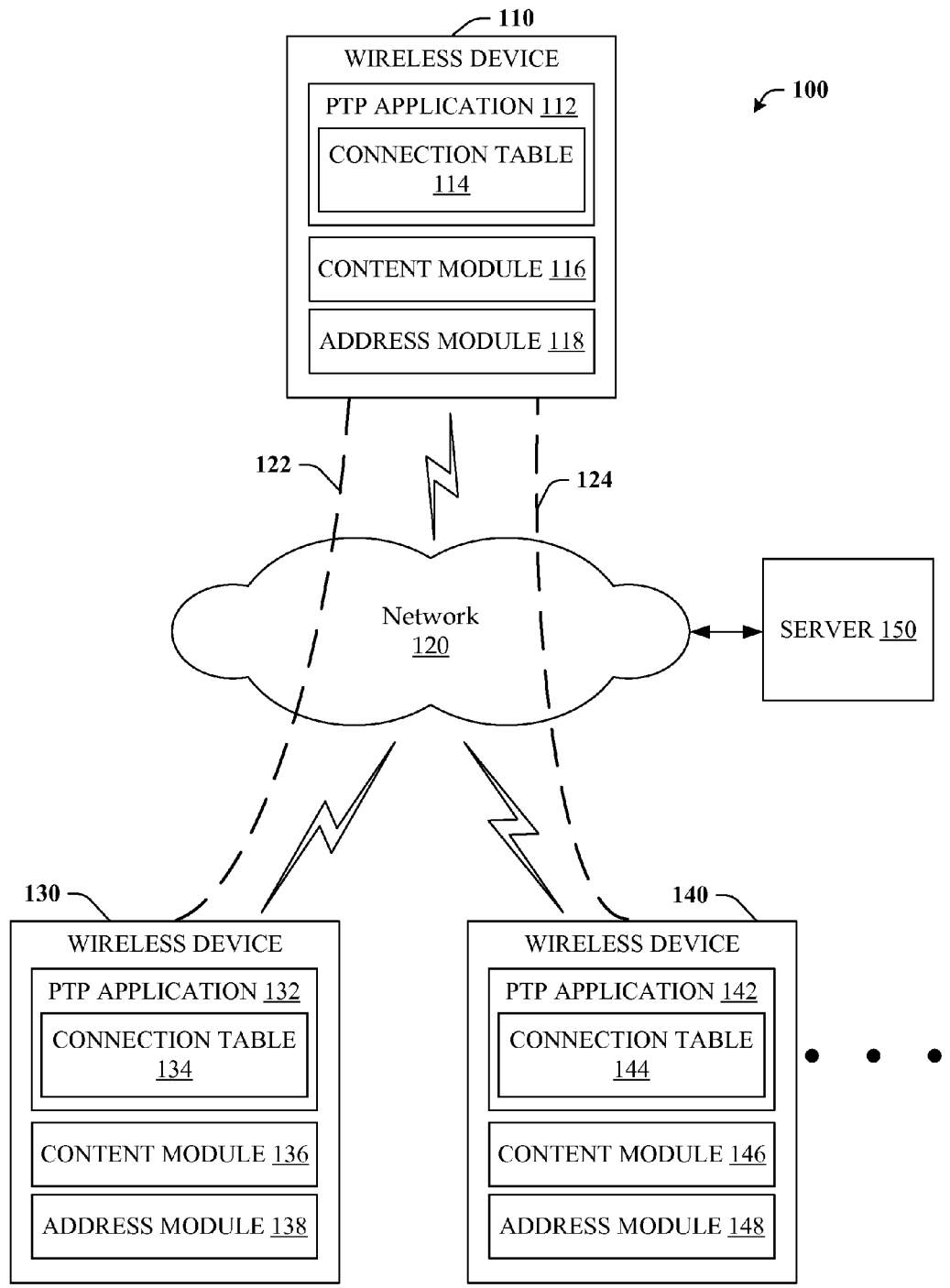
FIG. 1 illustrates a block diagram of a communication network according to an aspect.

With reference to FIG. 1, a block diagram of a communication network 100 according to an aspect is illustrated. Communication network 100 may include at least two wireless devices 110, 130, 140 (FIG. 1 depicts an ellipsis next to wireless device 140 as a representation of a plurality of wireless devices not shown) connected to a communication network 120, e.g., a CDMA network, a GPRS network, a UMTS network, and other types of communication networks. In one aspect, a peer-to-peer (PTP) application 112, 132, 142, e.g., a set of computer executable instructions, resident on each wireless device 110, 130, 140, is executable to effect an exchange of content between wireless devices (as depicted, between 110 and 130, and 110 and 140). As depicted, communication of content between wireless devices 110, 130, 140 may occur without requiring a dedicated network server 150, e.g., a multimedia server (MMS). Additionally, or in the alternative, a network server may be used to assist in facilitating one-to-one communications or one-to-many communications. For example, wireless device 110 may communicate with multiple wireless devices (e.g. 130, 140) by uploading content to network server 150, and thereafter, network server may transmit the content to the multiple destination devices. As such, the transmitted content may linger at server 150 for a predetermined duration of time. In one aspect, if after the predetermined duration of time, the content has not been transmitted to at least one other wireless device, server 150 may transmit a failure message to the wireless device 110. Additionally, server 150 may be utilized by a wireless device for storage of content. Furthermore, response content may be directed to network server 150 prior to return transmission to wireless device 110, thereby effectively managing data load levels to and from wireless device 110. In one aspect, server 150 may substantially constantly receive content from a wireless device, such as during streaming of content to one or more other wireless device, during a backup of content on the wireless device, etc.

In operation, wireless device 110 may use PTP application 112 to initiate a communication with wireless device 130. In one aspect, wireless device 110 may obtain the address of wireless device 130 from address module 118, while in another aspect a user may provide the address for wireless device 130 (e.g. inputting a phone number, IP address, etc.). With the destination address known, PTP application 112 may establish a communication path 122 with wireless device 130 via network 120. In one aspect, communication path 122 is a half duplexed connection (e.g. only allowing one of the devices access to the path at a time). After the communication path 122 is established, wireless device 110 may use content module 116 to access content on wireless device 110. For example, content module 116 may facilitate recording of a voice message (e.g. an EVRC encoded voice packet), and subsequent encoding of the message for transfer. Additionally, or in the alternative, content module 116 may allow a user to transmit screen captures, stored files, photos, etc.

In one aspect, PTP application 112 may include connection table 114 to aid in facilitating multiple communication paths. For example, as depicted in FIG. 1, wireless device 110 may use PTP application 112 to connect with two wireless devices 130 and 140 via network 120. In such an aspect, communication path 122 provides a one-to-one connection with wireless device 130 and communication path 124 provides a one-to-one communication path with wireless device 140. Additionally, or in the alternative, server 150 may be used to route connections from wireless device 110 to a plurality of wireless devices (e.g. 130, 140, etc.) thereby generating virtual communication paths (e.g. 122, 124, etc.). In such an aspect, server 150 may also provide a location for transmitted message to linger for a set duration of time, or until a triggering event, such as but not limited to, connection with at least one wireless device occurs. Furthermore, server 150 may generate, consolidate, hold, share, send, etc., content for multiple PTP communication paths. In one aspect, the server 150 may provide store-and-forward messaging capabilities. Additionally, server 150 may act as an intermediary between various devices to provide additional functionalities such as; improved service through monitoring quality of service (QoS), providing compression methods, etc., for PTP connections, improved security by providing secure connections, encryption etc., for PTP connections. In one aspect, server 150 may act as a web-server to provide access to messages, and the like, as part of an instant message, chat, web based service.

In one aspect, upon receipt of content from wireless device 110, wireless device 130 may use PTP application 132 to unpackage and present the content on wireless device 130. Furthermore, wireless device 130 may use content module 136 to obtain content from wireless device 130 for transmission to wireless device 110 over communication path 122. In one aspect, to avoid delays associated with establishing communication path 122, wireless devices 110 and 130 actively maintain communication path 122 until a trigger event occurs (e.g. timing out, termination on the like by one of the wireless devices, etc.) In one aspect, communication path 122 is persistently maintained in an active state using at least one of: a dormancy/wake up process, a high latency approach to deter dormancy, etc. For example, protocols such as TCP/IP, UDP, etc. or a native link may use a periodic TCP/IP, ICMP, etc. ping to maintain the active state. In one aspect, an application level protocol such as but not limited to http may perform dedicated polling, periodic polling, etc. to maintain the active state. Furthermore, in one aspect, communication path 122 may be persistently maintained in a constantly active state through transmission and/or reception of content in shorts bursts, for example during streaming of content, or the like. In another aspect, additionally, or in the alternative, wireless device 140 may also receive content from wireless device 110. As such, wireless device 140 may use PTP application 142 to unpackage and present the content on wireless device 140. Furthermore, wireless device 140 may use content module 146 to obtain content from wireless device 140 for transmission to wireless device 110 over communication path 124. Additionally, wireless devices 130, 140 may have address modules 138, 148 to at least assist in establishing communication paths 122 and 124.

Figure 2:
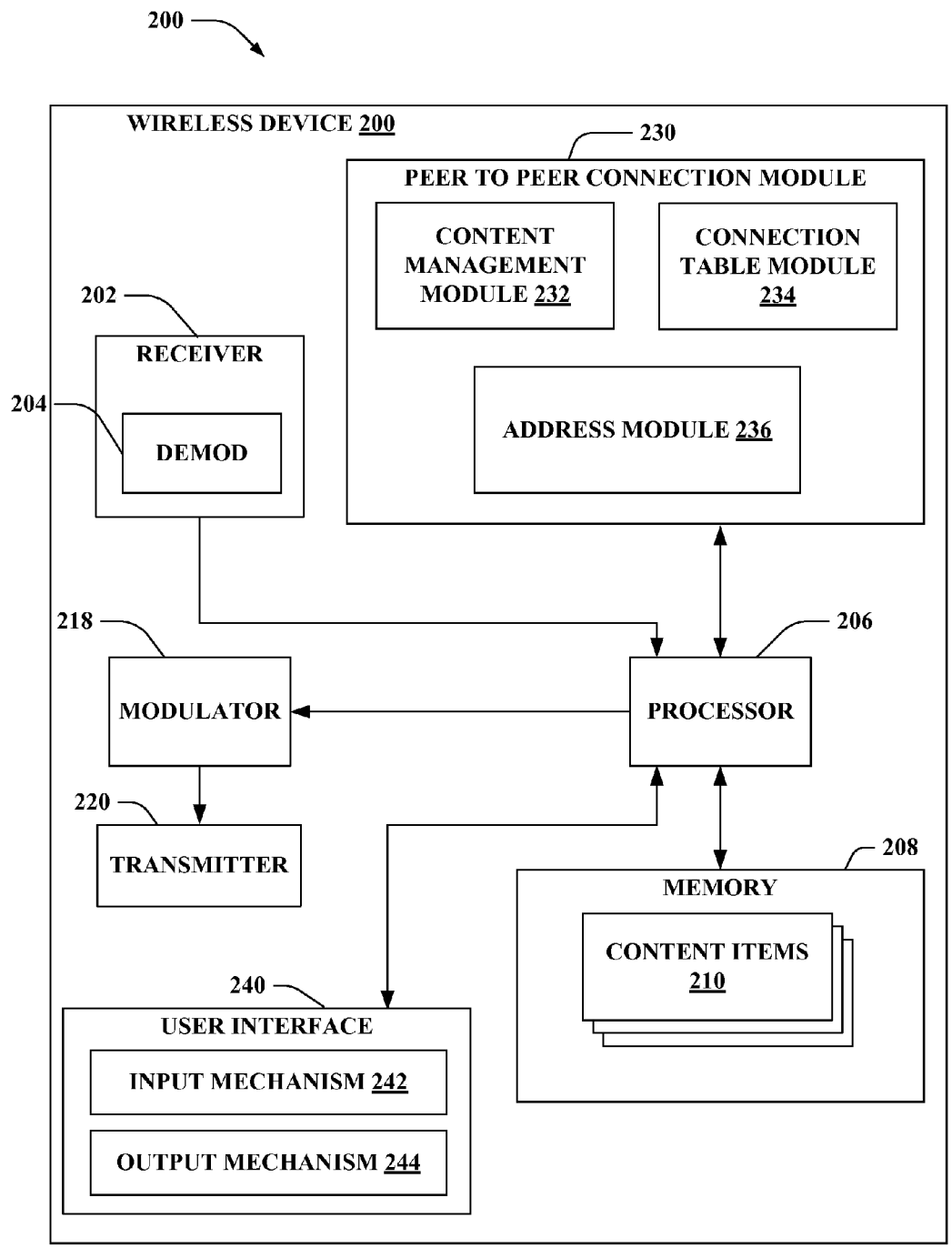
FIG. 2 illustrates a block diagram example architecture of a wireless device.

While still referencing FIG. 1, but turning also now to FIG. 2, an example architecture of wireless device 110, 130, 140 is illustrated. As depicted in FIG. 2, wireless device 200 comprises a receiver 202 that receives a signal from, for instance, a receive antenna (not shown), performs typical actions on (e.g., filters, amplifies, downconverts, etc.) the received signal, and digitizes the conditioned signal to obtain samples. Receiver 202 can comprise a demodulator 204 that can demodulate received symbols and provide them to a processor 206 for channel estimation. Processor 206 can be a processor dedicated to analyzing information received by receiver 202 and/or generating information for transmission by a transmitter 220, a processor that controls one or more components of mobile device 200, and/or a processor that both analyzes information received by receiver 202, generates information for transmission by transmitter 220, and controls one or more components of mobile device 200.

Mobile device 200 can additionally comprise memory 208 that is operatively coupled to processor 206 and that can store data to be transmitted, received data, information related to available channels, data associated with analyzed signal and/or interference strength, information related to an assigned channel, power, rate, or the like, and any other suitable information for estimating a channel and communicating via the channel. In one aspect, memory 208 can include content items 210, such as but not limited to, user generated content, pictures, screen captures, voice recordings, etc. In one aspect, user generated content may include visual and/or non-visual content, for example: photos, sound files, text messages, etc. In one aspect, sound files may be stored in any number of file formats, such as: .qcp, .wav, .aac, etc. In one aspect, photos may be stored in any number of file formats, such as: .gif, .jpeg, .tiff, .bmp, etc. Memory 208 can additionally store protocols and/or algorithms associated with estimating and/or utilizing a channel (e.g., performance based, capacity based, etc.).

It will be appreciated that the data store (e.g., memory 208) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 208 of the subject systems and methods may comprise, without being limited to, these and any other suitable types of memory.

Mobile device 200 can further comprise peer-to-peer (PTP) connection module 230 to facilitate communication between a plurality of wireless devices 200. PTP connection module 230 may further comprise content management module 232 to assist PTP connection module 230 in presenting, generating, receiving, transmitting, storing, etc., content items, such as content items 210, with at least one of a plurality of wireless devices 200. PTP connection module 230 may further comprise connection table module 234 to assist PTP connection module 230 in organizing multiple one-to-one connections with multiple wireless devices. Additionally, PTP connection module 230 may further comprise address module 236 to assist PTP connection module 230 in establishing a communication path with at least one of a plurality of wireless devices 200. Address module 236 may assist in transmitting the wireless devices address, such as but not limited to IP address. Additionally, address module 236 may assist PTP connection module is receiving other wireless device addresses and establishing communications paths with those wireless devices 200.

Additionally, mobile device 200 may include user interface 240. User interface 240 may include input mechanisms 242 for generating inputs into wireless device 200, and output mechanism 242 for generating information for consumption by the user of the wireless device 200. For example, input mechanism 242 may include a mechanism such as a key or keyboard, a mouse, a touch-screen display, a microphone, etc. Further, for example, output mechanism 244 may include a display, an audio speaker, a haptic feedback mechanism, a Personal Area Network (PAN) transceiver etc. In the illustrated aspects, the output mechanism 244 may include a display operable to present media content that is in image or video format or an audio speaker to present media content that is in an audio format.

In operation, user may prompt the wireless device 200 to initiate PTP connection module 230 through an input mechanism. The PTP connection module 230 may then connect to at least one other wireless device. In one aspect, the at least one other wireless device is located through the address module 236. In another aspect, the user may provide at least one address for at least one wireless device through the input mechanism. For example, the user may input the phone number of the desired wireless device. The address module 236 may then convert the phone number into IP address of the desired wireless device. In one aspect in which multiple wireless devices are contacted, the connection table module may organize the address and content to maintain, at least the appearance of, individual one-to-one communication paths. Once the PTP connection module has established the desired communication path, the user may input or obtain content items 210 to send to the wireless device or devices presently connected. Once transmission of content items is complete, the wireless device may receive content items from another wireless device. For example, a user may record a short message, which is saved to a file, on the wireless device. The file may then be transmitted and presented to another wireless device. A user of the receiving wireless device may then record a message to a file of the receiving wireless device and transmit the message to the original wireless device. The sequential transmission between wireless devices is not limited to voice files. In other examples, the original wireless device may transmit a photo file, a screen captures, etc. Exemplary screen shots of multiple wireless devices communicating via a network are presented and discussed in greater depth below with reference to FIG. 4.

Figure 3:
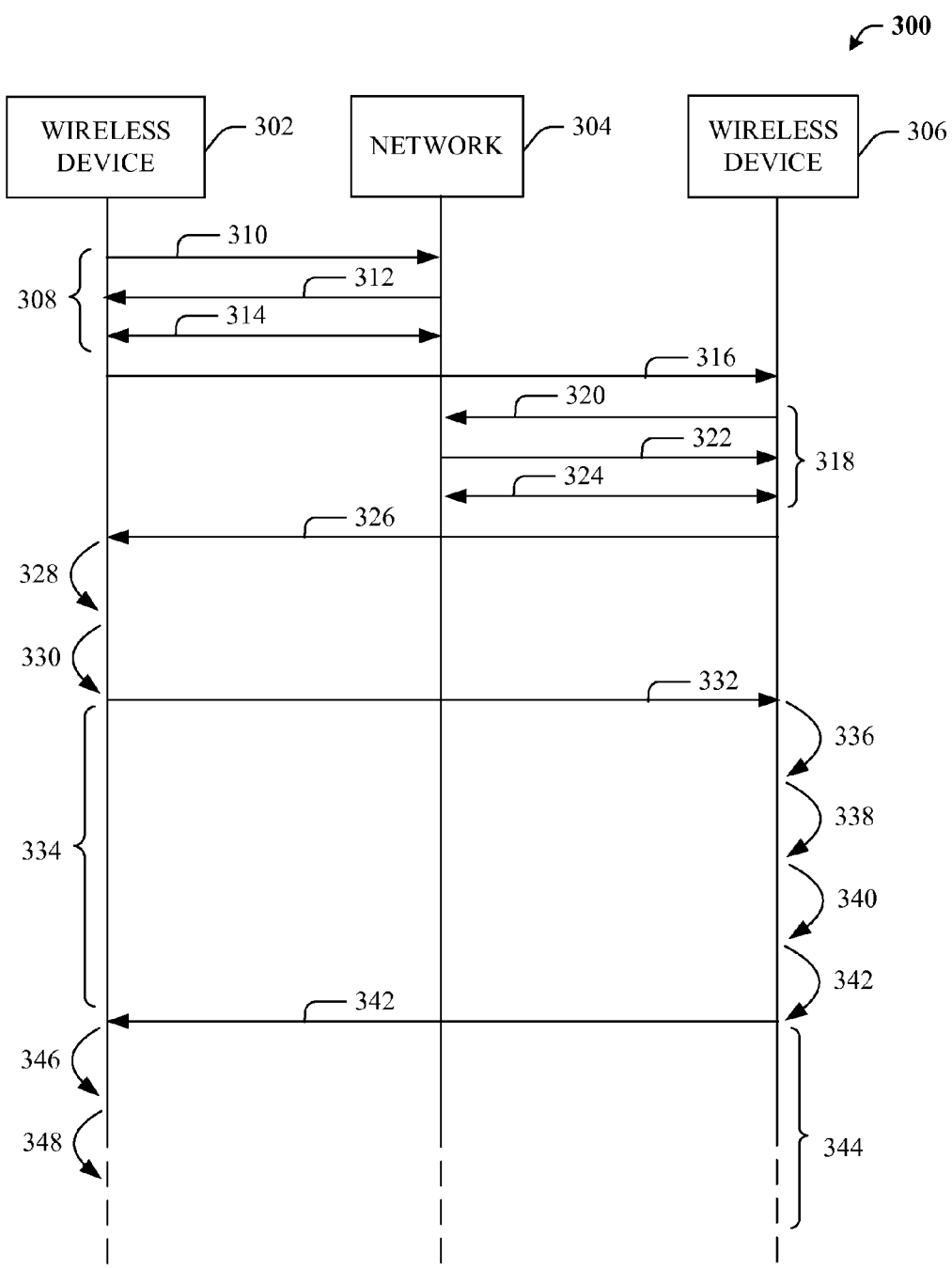
FIG. 3 illustrates a message sequence chart of operation of an aspect depicted in FIG. 1.

With reference to FIG. 3, operation of the subject matter depicted in FIG. 1 in the form of a message sequence diagram 300 is illustrated. Originating wireless device 302 establishes a data call connection 308 with communication network 304. In one aspect, establishing a data call connection 308 may include the wireless device 302 originating a packet data call at sequence step 310, receiving a service connect message from network 304 at sequence step 312, and negotiating a Point-to-Point Protocol (PPP) between the wireless device 302 and the network 304 at sequence step 314. During establishment of the data call connection, wireless device 302 obtains a network address, e.g., an Internet Protocol (IP) address, designating the address of the wireless device 302 on communication network 304. In one aspect, the connection is established using TCP/IP, UDP, etc., a native link, or a network level protocol. In another aspect, higher level application level protocols such as http, https, etc. enable transaction level activity to facilitate the connection. In one aspect, after establishing the data call connection, execution of PTP application by wireless device 302 causes the wireless device to transmit (sequence step 316) a message to destination wireless device 302 using communication network 304. In the aspect depicted in FIG. 3, only one destination wireless device is shown for clarity of presentation and does not limit the scope of the claimed subject matter. In another aspect, multiple destination wireless devices receive a message from wireless device 302.

The connection message may include the address of wireless device 302 as well as a predetermined secondary address or sub-address, e.g., a port number, at the wireless device 302 address. In one aspect, the connection message transmitted at sequence step 316 is transmitted using a short message service such as an SMS message. In another, the connection message content is encrypted to prevent eavesdropping of the message content. In another aspect, the connection message content is digitally signed to prevent tampering with the message content.

Returning to the description of the FIG. 3 message sequence diagram, after receipt of the connection message, wireless device 306 establishes a data call connection 318 with communication network 304. In one aspect, establishing a data call connection 318 may include the wireless device 306 originating a packet data call at sequence step 320, receiving a service connect message from network 304 at sequence step 322, and negotiating a PPP between the wireless device 306 and the network 304 at sequence step 324. After establishing the data call connection 318, wireless device 306 establishes a connection, such as a socket connection, with wireless device 302, at an address and sub-address specified in the connection message, using communication network 304 (sequence step 326). The term socket connection includes a communication connection between two uniquely identified endpoints. In one aspect, the connection setup includes the exchange of encryption information, e.g., public and private key pairs. In another aspect, exchange of encryption information occurs using a service such as, SMS messages, or content communication, e.g., the established data connection described above.

Upon notification of the establishing communication path, wireless device 302 may generate, obtain, etc., content at sequence step 328. The wireless device 302 may then package the generated, obtained, etc., content to prepare for transmission over the communication path established at sequence step 326. At sequence step 332, wireless device 302 transmits the content to wireless device 306. Additionally, in one aspect, to prevent future delays associated with initiating the communication path, wireless device 302 maintains the communication path with wireless device 306 (sequence step 334).

Wireless device 306 receives and unpackage the content (sequence step 336), and presents the content on wireless device 306 (sequence step 338). Wireless device 306 may then generate, obtain, etc., content (sequence step 340), package the content (sequence step 342), and transmit the content to wireless device 302 (sequence step 344) over the maintained communication path. Additionally, in one aspect, to prevent future delays associated with initiating the communication path, wireless device 306 maintains the communication path with wireless device 302 (sequence step 346). Wireless device 302 may unpackage the content (sequence step 348) and present the content on wireless device 302 (sequence step 350) and the sequence may continue until at least one of the following occurs: one of the wireless devices terminates the communication path, the communication path times out, or the like.

Figure 4:
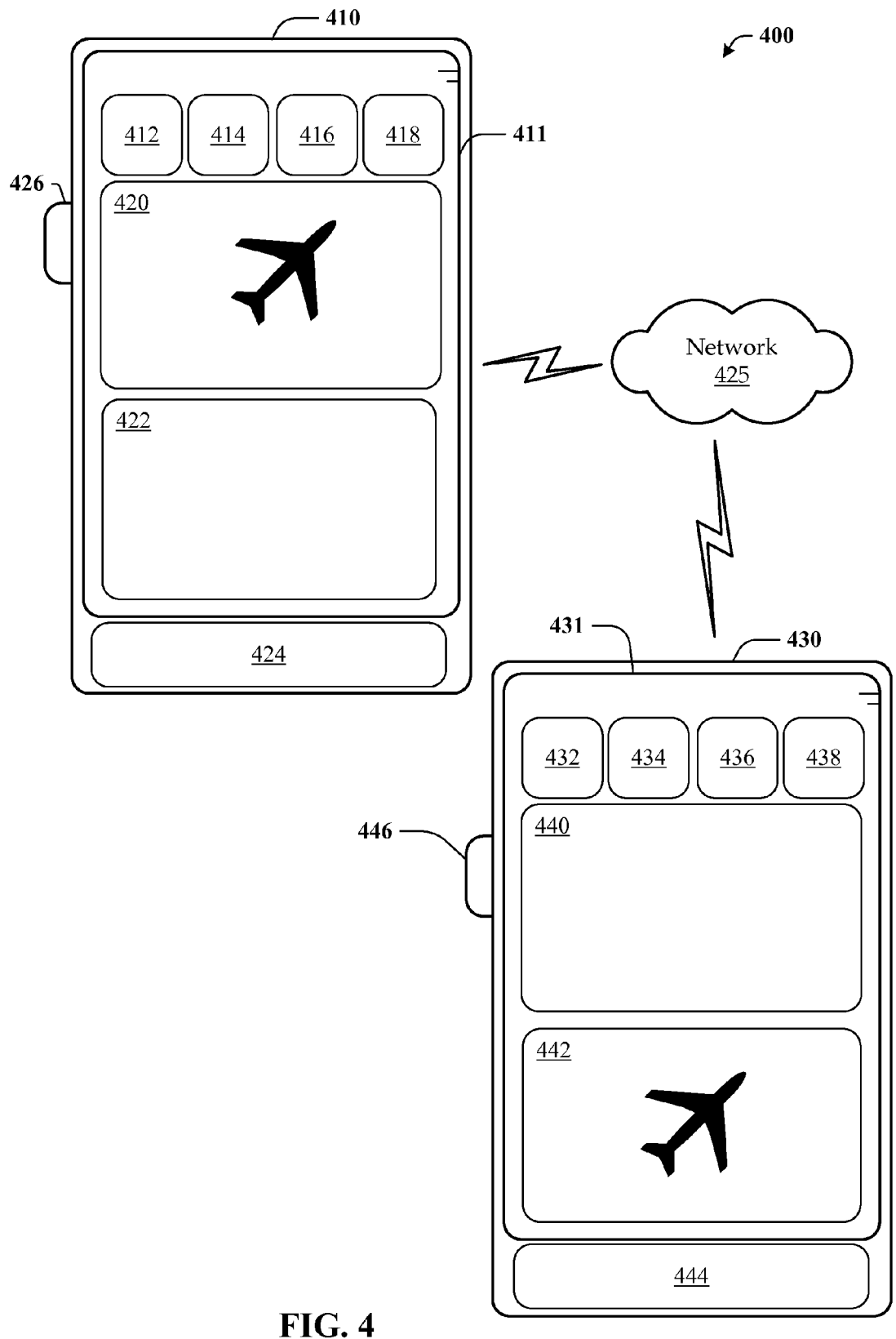
FIG. 4 illustrates exemplary screen shots according to an aspect.

With reference to FIG. 4, exemplary screen shots depicting an interaction between two wireless devices 410, 430 in a communication system 400 via a network 425. As depicted, wireless device 410 may include input mechanisms 424 for generating inputs into wireless device 410, and output mechanism 411 for generating information for consumption by the user of the wireless device 410. For example, input mechanism 424 may include a mechanism such as a key or keyboard, a mouse, a touch-screen display, a microphone, etc. Further, for example, output mechanism 411 may include a display, an audio speaker, a haptic feedback mechanism, a Personal Area Network (PAN) transceiver, etc. In the illustrated aspects, the output mechanism 411 may include a display operable to present media content that is in image or video format and/or an audio speaker to present media content that is in an audio format. Furthermore, in the depicted aspect, wireless device 410 presents a user with a display including options to record a message 412, generate a screen capture 414 of content displayed on a portion of the wireless device screen 420, obtain a photograph 416 (e.g. from a built in camera, from a file stored on wireless device 410, etc.), and other default or user selected options 418. For example, in one aspect, user selected options 418 may include functionality to obtain and/or present of any form of user generated content (visual and non-visual) such as but not limited to: photos, sounds files, text messages, and/or any other form of user generated content.

In one aspect, a user may record a message using a push-to-talk button 426, wherein the user may begin a recording duration by pressing the button 426, may present audio material for recording while the button 426 is pressed, and may stop the recording duration by releasing the button 426. As briefly discussed above, in the depicted aspect, a portion of the display 420 of wireless device 410 allows for presentation of content that may be transmitted to another wireless device. Additionally, a portion of the display 422 of wireless device 410 allows for presentation of content that has been received from another wireless device. Furthermore, in one aspect, display capturing functionalities may include: in-process display capture of one or more applications on the wireless device, display capture as an output of one or more applications on the wireless device, saving display capture content to memory associated with the wireless device (e.g. RAM, ROM, file, flash drive, etc.), sharing display capture content with other users, device, etc. such as during streaming of data, and copying, saving, moving, etc., display capture content to an internet server, etc. In one aspect, any area on the display 411 screen may be used to obtain, capture, or the like, content to be transmitted to another wireless device. Furthermore, any area on the display 411 screen may be used to view, present, or the like, content to be received from another wireless device.

Additionally, as depicted, wireless device 430 may include input mechanisms 444 for generating inputs into wireless device 430, and output mechanism 431 for generating information for consumption by the user of the wireless device 430. For example, input mechanism 444 may include a mechanism such as a key or keyboard, a mouse, a touchscreen display, a microphone, etc. Further, for example, output mechanism 431 may include a display, an audio speaker, a haptic feedback mechanism, a Personal Area Network (PAN) transceiver, etc. In the illustrated aspects, the output mechanism 431 may include a display operable to present media content that is in image or video format and/or an audio speaker to present media content that is in an audio format. Furthermore, in the depicted aspect, wireless device 430 presents a user with a display including options to record a message 432, generate a screen capture 414 of content displayed on a portion of the wireless device screen 430, obtain a photograph 436 (e.g. from a built in camera, from a file stored on wireless device 430, etc.), and other default or user selected options 438. In one aspect, a user may record a message using a push-to-talk button 446, wherein the user may begin a recording duration by pressing the button 446, may present audio material for recording while the button 446 is pressed, and may stop the recording duration by releasing the button 446. As briefly discussed above, in the depicted aspect, a portion of the display 440 of wireless device 430 allows for presentation of content that may be transmitted to another wireless device. Additionally, a portion of the display 442 of wireless device 430 allows for presentation of content that has been received from another wireless device.

In operation, as depicted in FIG. 4, in one example, display 411 of wireless device 410 may include an airplane image in a portion of the display designated for content to be transmitted 420. The image may be transmitted to wireless device 430 via network 425 and displayed on wireless device 430 in a portion of the display designated for received content 442. In one aspect, any area on the display 431 screen may be used to obtain, capture, or the like, content to be transmitted to another wireless device. Furthermore, any area on the display 431 screen may be used to view, present, or the like, content to be received from another wireless device.

Figure 5:
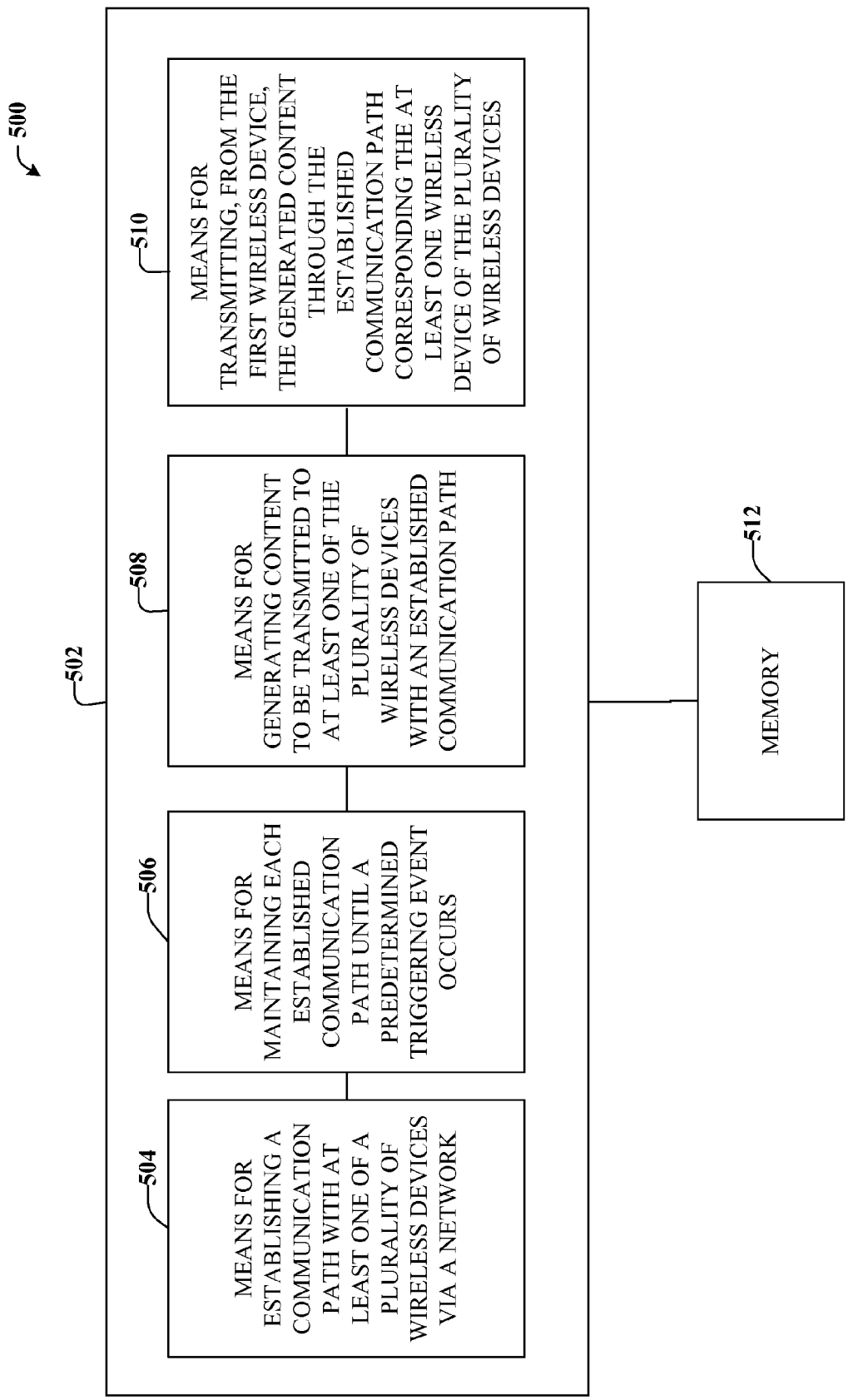
FIG. 5 illustrates a block diagram of an exemplary wireless device that can facilitate communication between a plurality of wireless devices.

With reference to FIG. 5, a block diagram of an exemplary system 500 that can facilitate communication between a plurality of wireless devices is illustrated. For example, system 500 can reside at least partially within a wireless device. According to another example aspect, system 500 can reside at least partially within an access terminal. It is to be appreciated that system 500 is represented as including functional blocks, which can be functional blocks that represent functions implemented by a processor, software, or combination thereof (e.g., firmware). System 500 includes a logical grouping 502 of means that can act in conjunction. For instance, logical grouping 502 can include means for establishing, by a first wireless device, a communication path with at least one of a plurality of wireless devices via a network 504. For example, a first wireless device may establish a communication path with a second wireless device or multiple one-to-one communication paths with multiple wireless devices by using a phone number, IP address or the like to identify the other wireless device or devices. Further, logical grouping 502 can comprise means for maintaining each established communication path until a triggering event occurs 506. For example, the communication path may be maintained in a high latency state when a rate of content transmission has dropped below a predefined threshold. For another example, the communication path may be maintained in a dormant state when a rate of content transmission has dropped below a predefined threshold, the dormant state being discontinued when a wake signal is received. Further, logical grouping 502 can comprise means for generating content, in the first wireless device, to be transmitted to at least one of the plurality of wireless devices with an established communication path 508. For example, a user of the first wireless device may generate a file encoding a short voice message, or may obtain a picture, screen capture, or the like. Further, logical grouping 502 can comprise means for transmitting, from the first wireless device, the generated content through the established communication path to the at least one wireless device of the plurality of wireless devices 510. As such, a plurality of wireless devices may communicate over a network through maintained communication paths. Additionally, system 500 can include a memory 512 that retains instructions for executing functions associated with the means 504, 506, 508, and 510. While shown as being external to memory 512, it is to be understood that one or more of the means 504, 506, 508, and 510 can exist within memory 512.

Figure 6:
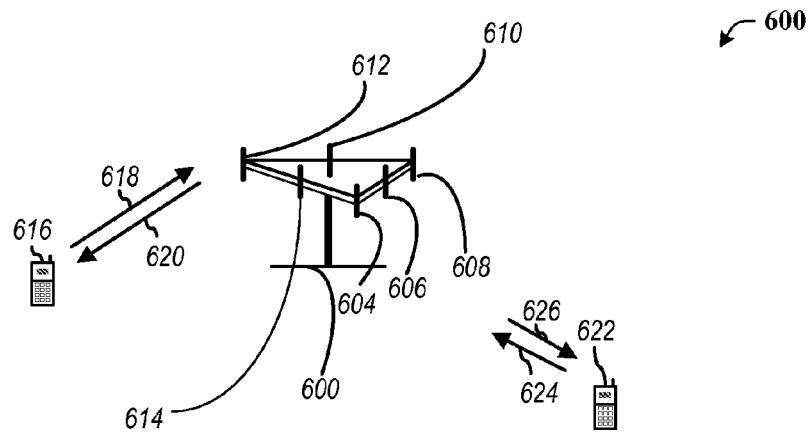
FIG. 6 illustrates an exemplary multiple access wireless communication system according to an aspect.

Referring to FIG. 6, a multiple access wireless communication system according to one aspect is illustrated. An access point 600 (AP) includes multiple antenna groups, one including 604 and 606, another including 608 and 610, and an additional including 612 and 614. In FIG. 6, only two antennas are shown for each antenna group, however, more or fewer antennas may be utilized for each antenna group. Access terminal 616 (AT) is in communication with antennas 612 and 614, where antennas 612 and 614 transmit information to access terminal 616 over forward link 620 and receive information from access terminal 616 over reverse link 618. Access terminal 622 is in communication with antennas 606 and 608, where antennas 606 and 608 transmit information to access terminal 622 over forward link 626 and receive information from access terminal 622 over reverse link 624. In a FDD system, communication links 618, 620, 624 and 626 may use different frequency for communication. For example, forward link 620 may use a different frequency then that used by reverse link 618.

Each group of antennas and/or the area in which they are designed to communicate is often referred to as a sector of the access point. In the aspect, antenna groups each are designed to communicate to access terminals in a sector, of the areas covered by access point 600.

In communication over forward links 620 and 626, the transmitting antennas of access point 600 utilize beamforming in order to improve the signal-to-noise ratio of forward links for the different access terminals 616 and 624. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may be also referred to as an access point, a Node B, or some other terminology. An access terminal may also be called an access terminal, user equipment (UE), a wireless communication device, terminal, access terminal or some other terminology.

Figure 7:
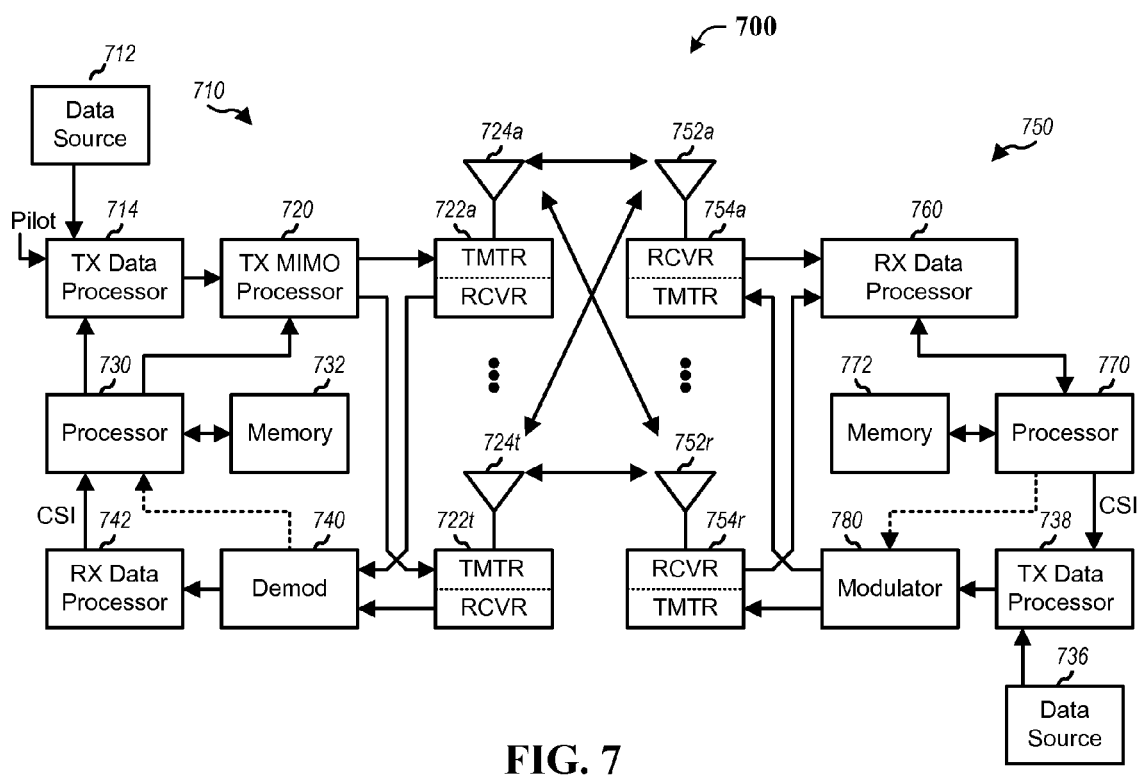
FIG. 7 depicts a block diagram of an exemplary communication system.

Referring to FIG. 7, a block diagram of an aspect of a transmitter system 710 (also known as the access point) and a receiver system 750 (also known as access terminal) in a MIMO system 700 is illustrated. At the transmitter system 710, traffic data for a number of data streams is provided from a data source 712 to a transmit (TX) data processor 714.

In an aspect, each data stream is transmitted over a respective transmit antenna. TX data processor 714 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 730.

The modulation symbols for all data streams are then provided to a TX MIMO processor 720, which may further process the modulation symbols (e.g., for OFDM). TX MIMO processor 720 then provides $N_T$ modulation symbol streams to $N_T$ transmitters (TMTR) 722a through 722t. In certain aspects, TX MIMO processor 720 applies beamforming weights to the symbols of the data streams and to the antenna from which the symbol is being transmitted.

Each transmitter 722 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 722a through 722t are then transmitted from $N_T$ antennas 724a through 724t, respectively.

At receiver system 750, the transmitted modulated signals are received by $N_R$ antennas 752a through 752r and the received signal from each antenna 752 is provided to a respective receiver (RCVR) 754a through 754r. Each receiver 754 conditions (e.g., filters, amplifies, and downconverts) a respective received signal, digitizes the conditioned signal to provide samples, and further processes the samples to provide a corresponding "received" symbol stream.

An RX data processor 760 then receives and processes the $N_R$ received symbol streams from $N_R$ receivers 754 based on a particular receiver processing technique to provide $N_T$ "detected" symbol streams. The RX data processor 760 then demodulates, deinterleaves, and decodes each detected symbol stream to recover the traffic data for the data stream. The processing by RX data processor 760 is complementary to that performed by TX MIMO processor 720 and TX data processor 714 at transmitter system 710.

A processor 770 periodically determines which pre-coding matrix to use (discussed below). Processor 770 formulates a reverse link message comprising a matrix index portion and a rank value portion.

The reverse link message may comprise various types of information regarding the communication link and/or the received data stream. The reverse link message is then processed by a TX data processor 738, which also receives traffic data for a number of data streams from a data source 736, modulated by a modulator 780, conditioned by transmitters 754a through 754r, and transmitted back to transmitter system 710.

At transmitter system 710, the modulated signals from receiver system 750 are received by antennas 724, conditioned by receivers 722, demodulated by a demodulator 740, and processed by a RX data processor 742 to extract the reserve link message transmitted by the receiver system 750. Processor 730 then determines which pre-coding matrix to use for determining the beamforming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In an aspect, Logical Traffic Channels comprises a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), a Uplink Shared Data Channel (UL-SDCH) and plurality of PHY channels. The PHY channels comprise a set of DL channels and UL channels. The DL PHY channels may comprise:
    Common Pilot Channel (CPICH)
    Synchronization Channel (SCH)
    Common Control Channel (CCCH)
    Shared DL Control Channel (SDCCH)
    Multicast Control Channel (MCCH)
    Shared UL Assignment Channel (SUACH)
    Acknowledgement Channel (ACKCH)
    DL Physical Shared Data Channel (DL-PSDCH)
    UL Power Control Channel (UPCCH)
    Paging Indicator Channel (PICH)
    Load Indicator Channel (LICH)
    The UL PHY Channels:
    Physical Random Access Channel (PRACH)
    Channel Quality Indicator Channel (CQICH)
    Acknowledgement Channel (ACKCH)

Antenna Subset Indicator Channel (ASICH)
Shared Request Channel (SREQCH)
UL Physical Shared Data Channel (UL-PSDCH)
Broadband Pilot Channel (BPICH)

In an aspect, a channel structure is provided that preserves low PAR (at any given time, the channel is contiguous or uniformly spaced in frequency) properties of a single carrier waveform.

For the purposes of the present document, the following abbreviations may apply:
AM Acknowledged Mode
AMD Acknowledged Mode Data
ARQ Automatic Repeat Request
BCCH Broadcast Control CHannel
BCH Broadcast CHannel
C- Control-
CCCH Common Control CHannel
CCH Control CHannel
CCTrCH Coded Composite Transport Channel
CP Cyclic Prefix
CRC Cyclic Redundancy Check
CTCH Common Traffic CHannel
DCCH Dedicated Control CHannel
DCH Dedicated CHannel
DL DownLink
DSCH Downlink Shared CHannel
DTCH Dedicated Traffic CHannel
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multimedia Broadcast Multicast Service
MCCH MBMS point-to-multipoint Control CHannel
MRW Move Receiving Window
MSB Most Significant Bit
MSCH MBMS point-to-multipoint Scheduling CHannel
MTCH MBMS point-to-multipoint Traffic CHannel
PCCH Paging Control CHannel
PCH Paging CHannel
PDU Protocol Data Unit
PHY PHYsical layer
PhyCH Physical CHannels
RACH Random Access CHannel
RLC Radio Link Control
RRC Radio Resource Control
SAP Service Access Point
SDU Service Data Unit
SHCCH SHared channel Control CHannel
SN Sequence Number
SUFI SUper FIeld
TCH Traffic CHannel
TDD Time Division Duplex
TFI Transport Format Indicator
TM Transparent Mode
TMD Transparent Mode Data
TTI Transmission Time Interval
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MBSFN multicast broadcast single frequency network
MCE MBMS coordinating entity
MCH multicast channel
DL-SCH downlink shared channel
MSCH MBMS control channel
PDCCH physical downlink control channel
PDSCH physical downlink shared channel As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 602.11 (Wi-Fi), IEEE 602.16 (WiMAX), IEEE 602.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 602.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method for facilitating communication between a plurality of wireless devices, the method comprising:
    establishing, by a first wireless device, a communication path with at least one of a plurality of wireless devices via a network, wherein the communication path provides for half duplexed direct communication between the first wireless device and the at least one of the plurality of wireless devices;
    maintaining each established communication path until a triggering event occurs;
    generating content, in the first wireless device, to be transmitted to at least one of the plurality of wireless devices with the established communication path, wherein the generated content includes non-voice data; and
    transmitting, from the first wireless device, the generated content through the established communication path to the at least one wireless device of the plurality of wireless devices;
    wherein the established communication path is maintained in a high latency state when a transmission rate of the generated content through the established communication path has dropped below a predefined threshold.

2. The method of claim 1, wherein generating content further comprises:

initiating, on the first wireless device, a content capturing application;

receiving user content on the first wireless device; and processing the user content with the content capturing application to generate content for transmission through the established communication path.

3. The method of claim 1, wherein the generated content includes at least one of:
an EVRC encoded voice packet, or
a message service message, or
a screen capture from the wireless device, or
a file stored on wireless device, or
user generated content.

4. The method of claim 1 wherein the establishing further comprises:
transmitting a connection message from the first wireless device to at least one of the plurality of wireless devices over the network, wherein the connection message includes a first address;
receiving, by the first wireless device, a response to the connection message from at least one of the plurality of wireless devices over the network, the response directed to the first wireless device by the first address and including an address of the at least one of the plurality of wireless devices that sent the response; and
establishing a communication path between the first wireless device and each of the plurality of wireless devices that sent the response through the respective address.

5. The method of claim 1, wherein the first address and the address of the at least one of the plurality of wireless devices are internet protocol addresses.

6. The method of claim 1, wherein establishing a communication path with at least one of a plurality of wireless devices further comprises:
establishing at least two communication paths with at least two of the plurality of wireless devices; and
generating a connections table to organize at least the communication paths and corresponding wireless devices.

7. The method of claim 1, wherein
the communication path is maintained in a dormant state when a transmission rate of the generated content through the established communication path has dropped below a predefined threshold, the dormant state being discontinued when a wake signal is received.

8. The method of claim 1, wherein the triggering event includes at least one of:
a transmission of a disconnect message from either the first wireless device or the one of plurality of wireless devices establishing the communication path, or
a lapse of a determined duration of time without receiving or transmitting content in the first wireless device.

9. The method of claim 1, further comprising transmitting the generated content to a server coupled to the network.

10. The method of claim 9, wherein the generated content is configured to perform at least one of:
lingering at the server for a predefined duration of time, thereafter the generated content is either transmitted to at least one wireless device or a failure message is transmitted to the content generating wireless device, or
terminating at the server for storage.

11. The method of claim 9, wherein transmitting the generated content further includes substantially continuously transmitting the generated content to the server.

12. The method of claim 1, wherein establishing the communication path further comprises establishing a direct, serverless connection between the first wireless device and the at least one of the plurality of wireless devices.

13. The method of claim 1, further comprising encrypting the generated content before transmission over the established communication path.

14. The method of claim 1 further comprising:
receiving response content at the first wireless device from at least one of the plurality of wireless devices through the corresponding established communication path, the response content being received after transmission of the generated content is complete.

15. At least one processor configured to facilitate communication between a plurality of wireless devices:
a first module for establishing, by a first wireless device, a communication path with at least one of a plurality of wireless devices via a network, wherein the communication path provides for half duplexed direct communication between the first wireless device and the at least one of the plurality of wireless devices;
a second module for maintaining each established communication path until a triggering event occurs;
a third module for generating content, in the first wireless device, to be transmitted to at least one of the plurality of wireless devices with an established communication path, wherein the generated content includes non-voice data; and
a fourth module for transmitting, from the first wireless device, the generated content through the established communication path to the at least one wireless device of the plurality of wireless devices;
wherein the established communication path is maintained in a high latency state when a transmission rate of the generated content through the established communication path has dropped below a predefined threshold.

16. A computer program product, comprising:
a non-transitory computer-readable medium comprising:
a first set of codes for causing a computer to establish a communication path with at least one of a plurality of wireless devices via a network, wherein the communication path provides for half duplexed direct communication between the first wireless device and the at least one of the plurality of wireless devices;
a second set of codes for causing the computer to maintain each established communication path until a triggering event occurs;
a third set of codes for causing the computer to generate content to be transmitted to at least one of the plurality of wireless devices with an established communication path, wherein the generated content includes non-voice data; and
a fourth set of codes for causing the computer to transmit the generated content through the established communication path to the at least one wireless device of the plurality of wireless devices;
wherein the established communication path is maintained in a high latency state when a transmission rate of the generated content through the established communication path has dropped below a predefined threshold.

17. An apparatus, comprising:
means for establishing, by a first wireless device, a communication path with at least one of a plurality of wireless devices via a network, wherein the communication path provides for half duplexed direct communication between the first wireless device and the at least one of the plurality of wireless devices;
means for maintaining each established communication path until a triggering event occurs;
means for generating content, in the first wireless device, to be transmitted to at least one of the plurality of wireless devices with an established communication path, wherein the generated content includes non-voice data; and means for transmitting, from the first wireless device, the generated content through the established communication path to the at least one wireless device of the plurality of wireless devices;

wherein the established communication path is maintained in a high latency state when a transmission rate of the generated content through the established communication path has dropped below a predefined threshold.

18. A wireless device enabled to facilitate communication with a plurality of other wireless devices, the wireless device comprising:

a connection module configured to establish a communication path with at least one of a plurality of wireless devices via a network, wherein the communication path provides for half duplexed direct communication between the first wireless device and the at least one of the plurality of wireless devices, and to maintain each established communication path until a triggering event occurs;

a content module configured to generate content to be transmitted to at least one of the plurality of wireless devices with an established communication path, wherein the generated content includes non-voice data; and the connection module further configured to transmit the generated content through the at least one established communication path to the corresponding wireless device of the plurality of wireless devices;

wherein the established communication path is maintained in a high latency state when a transmission rate of the generated content through the established communication path has dropped below a predefined threshold.

19. The wireless device of claim 18, wherein the content module it further configured to:

initiate a content capturing application;

receive user content on the first wireless device; and process the user content with the content capturing application to generate content for transmission through the established communication path.

20. The wireless device of claim 18, wherein the generated content includes at least one of:

an EVRC encoded voice packet, or a message service message, or a screen capture from wireless device, or a file stored on wireless device, or user generated content.

21. The wireless device of claim 18, wherein the connection module is further configured to:

transmit a connection message from the first wireless device to at least one of the plurality of wireless devices over the network, wherein the connection message includes a first address;

receive, by the first wireless device, a response to the connection message from at least one of the plurality of wireless devices over the network, the response directed to the first wireless device by the first address and including an address of the at least one of the plurality of wireless devices that sent the response; and establish a communication path between the first wireless device and each of the plurality of wireless devices that sent the response through the respective address.

22. The wireless device of claim 18, wherein the first address and the address of the at least one of the plurality of wireless devices are internet protocol addresses.

23. The wireless device of claim 18, wherein the connection module is further configured to:

establish at least two communication paths with at least two of the plurality of wireless devices; and generate a connections table to organize at least the communication paths and corresponding wireless devices.

24. The wireless device of claim 18, wherein the communication path is maintained in a dormant state when a transmission rate of the generated content through the established communication path has dropped below a predefined threshold, the dormant state being discontinued when a wake signal is received.

25. The wireless device of claim 18, wherein the triggering event includes at least one of:

a transmission of a disconnect message from either the first wireless device or the one of plurality of wireless devices establishing the communication path, or a lapse of a determined duration of time without receiving or transmitting content in the first wireless device.

26. The wireless device of claim 18, wherein the connection module is further configured to transmit the generated content to a server coupled to the network.

27. The wireless device of claim 26, wherein the content module is further configured to configure the generated content perform at least one of:

lingering at the server for a predefined duration of time, thereafter the generated content is either transmitted to at least one wireless device or a failure message is transmitted to the content generating wireless device, or terminating at the server for storage.

28. The wireless device of claim 26, wherein the connection module is further configured to substantially continuously transmit the generated content to the server.

29. The wireless device of claim 18, wherein the connection module is further configured to establish the communication path as a direct, serverless connection between the first wireless device and the at least one of the plurality of wireless devices.

30. The wireless device of claim 18, further comprising an encryption module configured to encrypt the generated content before transmission over the established communication path.

31. The wireless device of claim 18, wherein the communication module is further configured to receive response content at the first wireless device from at least one of the plurality of wireless devices through the corresponding established communication path, the response content being received after transmission of the generated content is complete.

32. The method of claim 1, wherein the generated content is provided in short bursts through the established communication path when the established communication path is in a constant activity state.

33. The at least one processor of claim 15, wherein the fourth module is further configured for transmitting the generated content in short bursts through the established communication path when the established communication path is maintained in a constant activity state.

34. The computer program product of claim 16, wherein the fourth set of codes is further configured for causing the computer to transmit the generated content generated short bursts through the established communication path when the established communication path is maintained in a constant activity state.

35. The apparatus of claim 17, further comprising means for providing the generated content in short bursts through the established communication path when the established communication path is maintained in a constant activity state.

36. The wireless device of claim 18, wherein the connection module is further configured to transmit the generated content in short bursts through the established communication path when the established communication path is maintained in a constant activity state.

\* \* \* \* \*